(12) United States Patent
Powell et al.

(10) Patent No.: US 9,748,779 B1
(45) Date of Patent: Aug. 29, 2017

(54) CONDITIONALLY DELAYED CHARGING OF A BARCODE READER'S RECHARGEABLE BATTERY

(71) Applicant: The Code Corporation, Draper, UT (US)

(72) Inventors: George Powell, Draper, UT (US); Ryan Hoobler, Salt Lake City, UT (US); Jessica Johnson, Midvale, UT (US)

(73) Assignee: The Code Corporation, Draper, UT (US)

( * ) Notice: Subject to any disclaimer, the term of this patent is extended or adjusted under 35 U.S.C. 154(b) by 0 days.

(21) Appl. No.: 15/290,879

(22) Filed: Oct. 11, 2016

(51) Int. Cl.
*G06K 7/10* (2006.01)
*H02J 7/00* (2006.01)
*G06K 7/14* (2006.01)
*G06K 19/06* (2006.01)

(52) U.S. Cl.
CPC ........ *H02J 7/0044* (2013.01); *G06K 7/10742* (2013.01); *G06K 7/10881* (2013.01); *G06K 7/1413* (2013.01); *G06K 19/06028* (2013.01); *H02J 7/007* (2013.01); *H02J 7/0047* (2013.01)

(58) Field of Classification Search
CPC ............ G06K 7/10; G06K 15/12; G06K 7/14; G06K 5/00; G06F 17/00; G03B 7/08
USPC ..... 235/462.42, 375, 462.41, 462.24, 462.11
See application file for complete search history.

(56) References Cited

U.S. PATENT DOCUMENTS

| 6,236,186 | B1 * | 5/2001 | Helton | H01M 10/42 320/106 |
|---|---|---|---|---|
| 8,917,506 | B2 * | 12/2014 | Diebel | G06F 1/1628 361/679.41 |
| 2007/0246540 | A1 * | 10/2007 | Barkan | G06K 7/10881 235/472.02 |
| 2009/0096417 | A1 * | 4/2009 | Idzik | H02J 7/0044 320/115 |
| 2015/0270734 | A1 * | 9/2015 | Davison | H02J 7/0054 320/103 |
| 2015/0271307 | A1 * | 9/2015 | Berg | H04M 1/0254 455/556.1 |
| 2016/0204636 | A1 * | 7/2016 | Allen | H02J 7/0006 320/115 |

* cited by examiner

*Primary Examiner* — Edwyn Labaze
(74) *Attorney, Agent, or Firm* — Timothy P. O'Hagan; Ray Quinney & Nebeker

(57) ABSTRACT

A barcode reader may include a barcode reading system, a rechargeable battery, and a battery charging system. The battery charging system may be configured so that, in response to detecting placement of the barcode reader in a charging cradle, the battery charging system delays charging the battery if a charge level of the battery is above a first threshold level.

17 Claims, 4 Drawing Sheets

CONDITIONALLY DELAYED CHARGING OF A BARCODE READER'S RECHARGEABLE BATTERY

BACKGROUND

A barcode is an optical machine-readable representation of information. Devices for identifying or extracting information from barcodes are generally referred to as barcode readers (or barcode scanners). Barcodes and barcode readers have become widely used in many different types of environments, such as hospitals, point-of-sale stations in retail stores and supermarkets, inventory and document tracking, and the like.

Barcode readers may be powered by a rechargeable battery, which is a type of electrical battery that can be charged, discharged, and recharged multiple times. Like non-rechargeable batteries, rechargeable batteries produce electrical current through an electrochemical reaction involving electrodes and an electrolyte. In a rechargeable battery, however, the electrochemical reaction is reversible. Several different combinations of electrode materials and electrolytes may be used. Some examples of rechargeable batteries on the market today include lithium ion, lithium ion polymer, nickel cadmium, nickel metal hydride, lead acid, etc.

The manufacturer of a barcode reader typically provides a holder for the reader, which is commonly referred to as a "cradle." In addition to providing a convenient place to store the reader, the cradle may also be used to charge the reader's rechargeable battery. When the cradle is connected to an external power source (e.g., a wall outlet, a desktop personal computer (PC)) and the barcode reader is placed within the cradle, the barcode reader draws electrical current from the cradle and thereby charges the reader's rechargeable battery.

Under some circumstances, it may be desirable to frequently clean and sanitize a barcode reader. This may be true, for example, if the barcode reader is used in a setting where maintaining sanitary conditions is important, such as a hospital or other medical facility. In some situations, the barcode reader may be cleaned with certain chemicals and then placed in the charging cradle before charging contacts on the barcode reader have had a chance to dry. In other words, the charging contacts may still be wet with cleaning solution when the barcode reader is placed inside the charging cradle. The interaction between the electrical current supplied by the charging cradle and the wet charging contacts of the barcode reader may cause corrosion on the charging contacts. Benefits may be realized by systems and methods that manage the charging of a rechargeable battery within a barcode reader so as to reduce this corrosion.

SUMMARY

In accordance with the present disclosure, a barcode reader may include a barcode reading system, a rechargeable battery, and a battery charging system. The battery charging system may be configured so that, in response to detecting placement of the barcode reader in a charging cradle, the battery charging system delays charging the battery if a charge level of the battery is above a first threshold level.

The battery charging system may implement a first charging phase in response to detecting the placement of the barcode reader in the charging cradle. The first charging phase may delay the charging of the battery. The battery charging system may implement a second charging phase after the first charging phase has been implemented for a time period.

The battery charging system may be configured so that during the first charging phase, the battery charging system draws electrical current from the charging cradle if the charge level of the battery is less than the first threshold level, and the battery charging system draws no electrical current from the charging cradle if the charge level of the battery is greater than or equal to the first threshold level.

Alternatively, the battery charging system may be configured so that during the first charging phase, the battery charging system draws electrical current from the charging cradle if the charge level of the battery is less than the first threshold level, and the battery charging system draws a reduced amount of electrical current from the charging cradle if the charge level of the battery is greater than or equal to the first threshold level.

Alternatively, the battery charging system may be configured so that during the first charging phase: i) the battery charging system draws electrical current from the charging cradle if the charge level of the battery is less than the first threshold level, ii) the battery charging system draws a reduced amount of electrical current from the charging cradle if the charge level of the battery is greater than or equal to the first threshold level and less than a second threshold level that is greater than the first threshold level, and iii) the battery charging system draws no electrical current from the charging cradle if the charge level of the battery is greater than or equal to the second threshold level.

The battery charging system may be configured so that during the second charging phase, the battery charging system draws electrical current from the charging cradle.

The barcode reader may include an indicator light. The battery charging system may be configured to activate the indicator light in response to detecting the placement of the barcode reader in the charging cradle.

The barcode reader may include a moisture sensor. The battery charging system may be configured to adjust a length of delay with respect to charging the battery based on output from the moisture sensor.

The charging cradle may include at least one of a heater and a fan. The charging cradle may also include a controller that activates the fan and/or the heater in response to detecting insertion of the barcode reader into the charging cradle.

DETAILED DESCRIPTION

Figure 1:
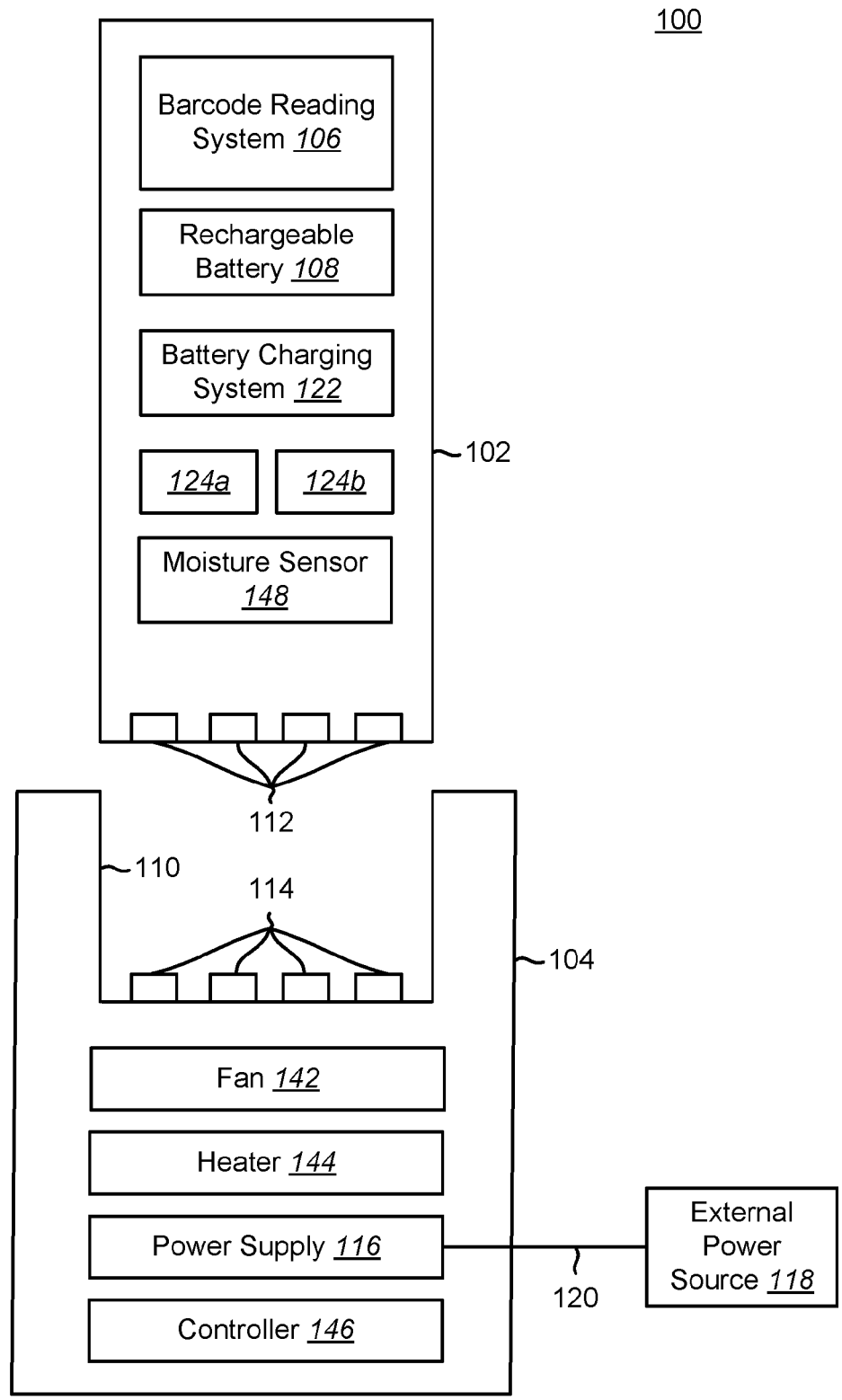
FIG. 1 illustrates a system for conditionally delayed charging of a barcode reader's rechargeable battery.

FIG. 1 illustrates a system 100 in accordance with the present disclosure. The system 100 includes a barcode reader 102 that is configured to interface with a charging cradle 104.

The reader 102 includes a barcode reading system 106. The barcode reading system 106 includes one or more components that function together to read barcodes. The barcode reading system 106 may include an illumination system, at least one sensor, and a decoder. The illumination system may illuminate a target area containing the barcode to be read. The sensor(s) may detect light that is reflected from the barcode and generate data that is representative of the information in the barcode. The decoder may interpret the data to extract the information in the barcode. Alternatively, the decoder may reside on an external device, such as a desktop PC, and the data may be sent to the external device for decoding.

The reader 102 may be a camera-based reader, a charge-coupled device (CCD) reader, a pen-type reader, a laser reader, etc. An example of the reader 102 and the barcode reading system 106 will be described below in connection with FIG. 4. The reader 102 may be a portable device, such that it may be easily picked up and carried from one place to the next by a user.

The reader 102 may also include a rechargeable battery 108. The rechargeable battery 108 may be referred to herein simply as a battery 108. The battery 108 may deliver power to the reader 102 during operation of the reader 102. The battery 108 may be any electrical battery that can be housed within (or otherwise used in connection with) the reader 102 and can be charged, discharged, and recharged multiple times. For example, the battery 108 may be a lithium-ion battery, a lithium-ion polymer battery, a nickel-cadmium battery, a nickel-metal hydride battery, etc.

The cradle 104 may include a recess 110 into which the reader 102 may be inserted. The size and shape of the recess 110 may be such that when the reader 102 is inserted into the recess 110, the reader 102 is held in place and charging contacts 112 on the reader 102 are coupled to mating contacts 114 on the cradle 104.

The cradle 104 may include a power supply 116. The cradle 104 may be electrically coupled to an external power source 118 via an electrical cable 120. The external power source 118 may be, for example, a building's alternating current (AC) power supply (via a wall outlet), in which case the cradle 104 may include an AC power receptacle. Alternatively, the external power source 118 may be a computing device, such as a desktop PC, in which case the cradle 104 may include a connector such as a Universal Serial Bus (USB) port. The power supply 116 may include circuitry (e.g., one or more transformers) for converting/conditioning electricity available from the external power source 118 into voltages/currents suitable for the reader 102.

When the cradle 104 is electrically coupled to the external power source 118 and the reader 102 is inserted into the cradle 104 such that the charging contacts 112 on the reader 102 are touching the mating contacts 114 on the cradle 104, the cradle 104 is capable of making electrical current available to the reader 102. The reader 102 may include a battery charging system 122 that controls charging of the battery 108. The charging system 122 may adjust impedance to draw the amount of electrical current needed for charging the battery 108.

For example, when the reader 102 is inserted into the cradle 104 such that the charging contacts 112 on the reader 102 are coupled to mating contacts 114 on the cradle 104, this may have the effect of completing an electrical circuit that also includes the power supply 116 and the battery 108. The charging system 122 may change the impedance of this electrical circuit in order to change the amount of electrical current that is being drawn from the power supply 116 of the cradle 104. The impedance may be increased in order to decrease the amount of electrical current that is being drawn from the cradle 104, and vice versa.

The reader 102 may include one or more indicator lights 124 that provide information about the charging status of the reader 102. Two indicator lights 124 are shown in FIG. 1. These indicator lights 124 will be referred to as a "charging" indicator light 124*a* and a "fully charged" indicator light 124*b*. The reader 102 may be configured so that the charging indicator light 124*a* is activated when the reader 102 is properly positioned in the cradle 104 (e.g., the charging contacts 112 on the reader 102 are electrically coupled to the corresponding mating contacts 114 on the cradle 104), and the charging indicator light 124*a* is not activated otherwise. In addition, the reader 102 may be configured so that the fully charged indicator light 124*b* is activated when the battery 108 is fully charged (e.g., charged to a maximum level), and the fully charged indicator light 124*b* is not activated otherwise.

In an alternative embodiment, the reader 102 may include a single indicator light 124 that indicates different states of the reader 102 by displaying different colors. For example, a first color (e.g., yellow) may indicate that the reader 102 is properly positioned in the cradle 104 but not fully charged. A second color (e.g., green) may indicate that the reader 102 is fully charged.

As noted above, if the reader 102 is frequently cleaned, the charging contacts 112 may sometimes be wet with cleaning solution when the reader 102 is placed inside of the cradle 104. In accordance with the present disclosure, the charging system 122 may be configured to conditionally delay charging of the battery 108 for some period of time after the reader 102 has been placed inside of the cradle 104. The goal may be to delay charging until the charging contacts 112 of the reader 102 have had a chance to dry. Because exposing the wet charging contacts 112 to electrical current may cause corrosion, delaying the charging of the battery 108 until the charging contacts 112 have partially or completely dried off may help reduce the amount of corrosion that builds up on the charging contacts 112.

It may not always be desirable to delay charging, however. The battery 108 may be severely drained when the reader 102 is placed in the cradle 104, in which case delaying charging may result in the battery 108 becoming fully depleted. This may be undesirable, because fully depleting the battery 108 may cause the reader 102 to become temporarily inoperable. Therefore, if the battery 108 is severely drained, it may be desirable to begin charging the battery 108 as soon as the reader 102 is placed in the cradle 104, without any delay, even if the charging contacts 112 are wet.

Figure 4:
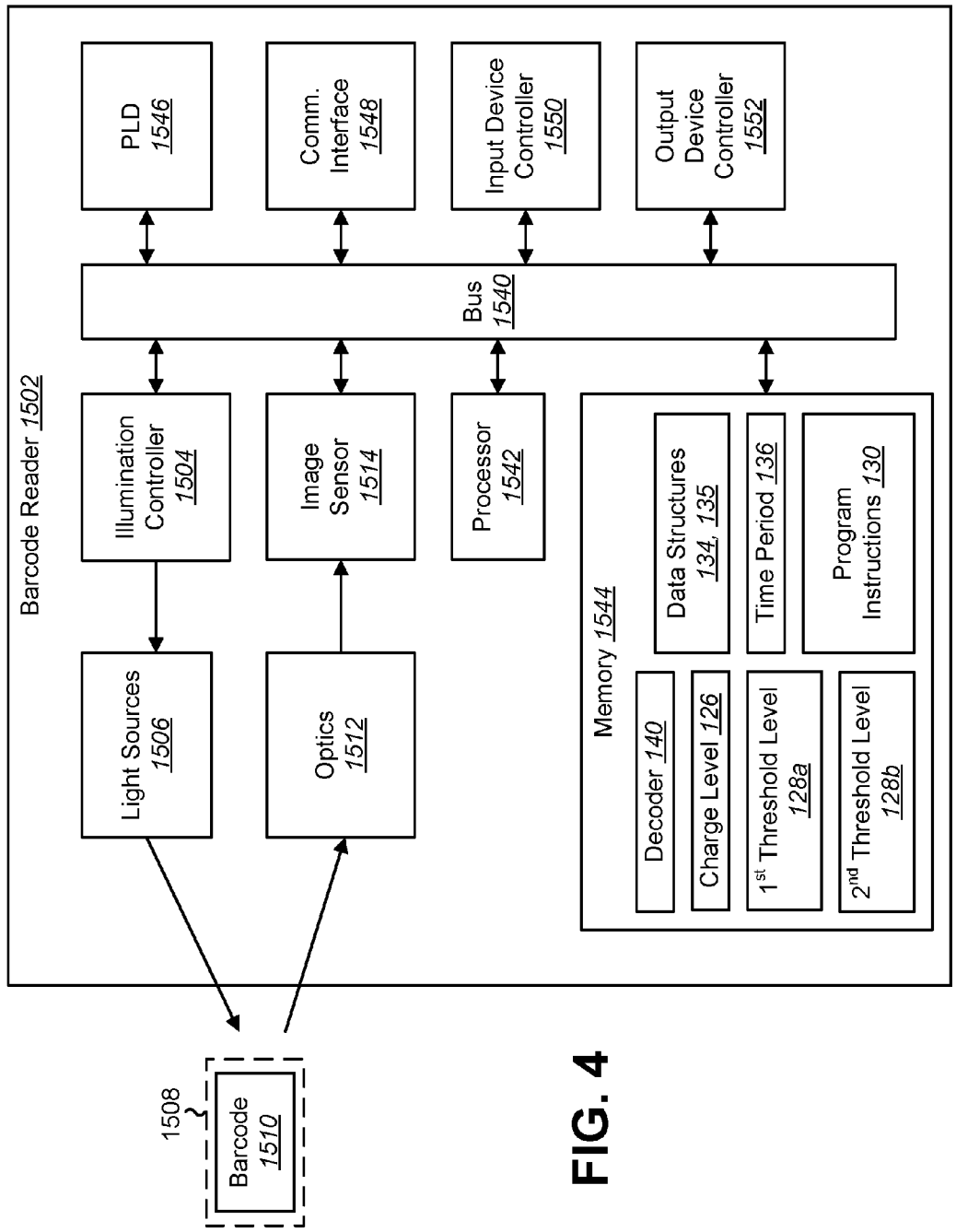
FIG. 4 illustrates various components that may be included in a barcode reader.

The charging system 122 may be configured to detect the charge level 126 of the battery 108, and this parameter may be stored in memory 1544 of the reader 102 (as shown in FIG. 4). The charging system 122 may be configured to determine whether charging should be delayed based on the charge level 126 of the battery 108. In other words, the delayed charging may be conditional on the charge level 126 of the battery 108. For example, the charging system 122 may be configured so that, in response to detecting placement of the reader 102 in the cradle 104, the charging system 122 delays charging the battery 108 only if the charge level 126 is above a threshold level 128*a*. The threshold level 128*a* may also be a parameter that is defined and stored in the memory 1544 of the reader 102. The threshold level 128*a* may be referred to herein as a first threshold level 128*a* to distinguish it from a second threshold level 128*b* that will be discussed below.

The cradle 104 may also include one or more components that may help reduce the amount of corrosion that builds up on the charging contacts 112 of the reader 102. For example, the cradle 104 may include a fan 142 and/or a heater 144. The cradle 104 may also include a controller 146 that activates the fan 142 and/or the heater 144 in response to detecting that the reader 102 has been inserted into the cradle 104. Activation of the fan 142 and/or the heater 144 may occur in addition to the delayed charging that may be implemented by the reader 102. Thus, both the reader 102 and the cradle 104 may take steps to reduce the amount of corrosion that builds up on the charging contacts 112.

Figure 2:
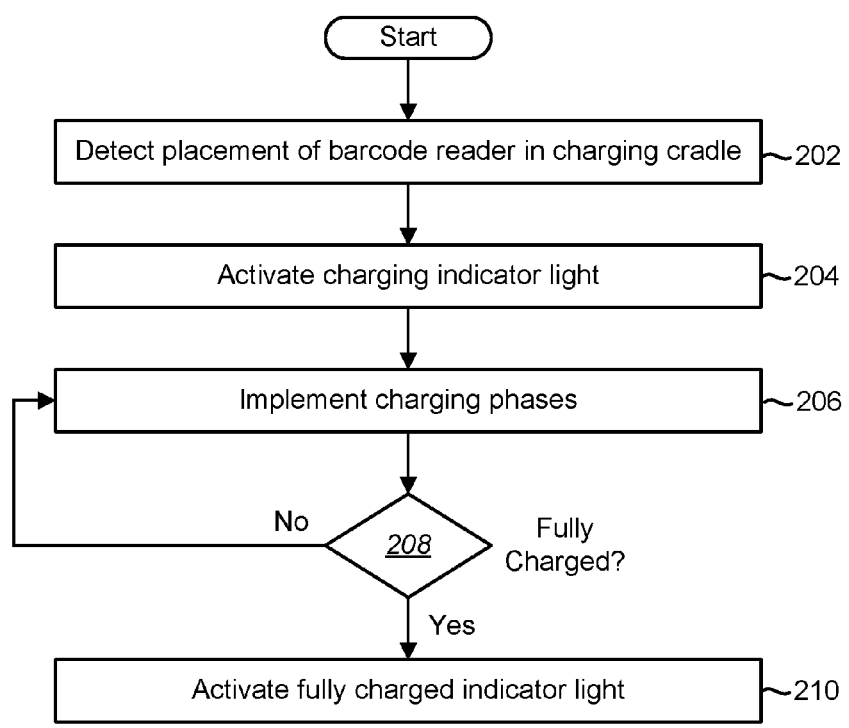
FIG. 2 illustrates a method for conditionally delayed charging of a barcode reader's rechargeable battery.

FIG. 2 illustrates a method 200 for conditionally delayed charging of the battery 108 of a reader 102. The method 200 may be implemented by the charging system 122 of the reader 102. The charging system 122 may execute program instructions 130 (computer-executable code) stored in memory 1544 of the reader 102 (as shown in FIG. 4) in order to implement some or all aspects of the method 200.

At step 202, the charging system 122 may detect placement of the reader 102 in the cradle 104. For example, the charging system 122 may detect availability of electrical current at the charging contacts 112.

At step 204, in response to detecting placement of the reader 102 in the cradle 104, the charging system 122 may activate the charging indicator light 124a. The charging indicator light 124a may be activated even if charging is to be delayed, in order to indicate to the user that the reader 102 has been properly placed in the cradle 104 and charging will commence at the appropriate time.

In a conventional barcode reader, charging begins as soon as the reader is placed in the cradle. In other words, the battery charging system of a conventional reader draws full current from the cradle as soon as the charging contacts of the reader are placed in contact with the mating contacts of the cradle. However, in accordance with the present disclosure, the charging system 122 of the reader 102 may not immediately draw full current from the cradle 104.

As used herein, the term "full current" may have different meanings in different contexts. For example, the term "full current" may refer to a defined amount of electrical current that the charging system 122 of the reader 102 is designed to utilize under normal operation. Alternatively, the term "full current" may refer to a maximum amount of electrical current that the charging system 122 of the reader 102 is capable of utilizing.

Figure 3A:
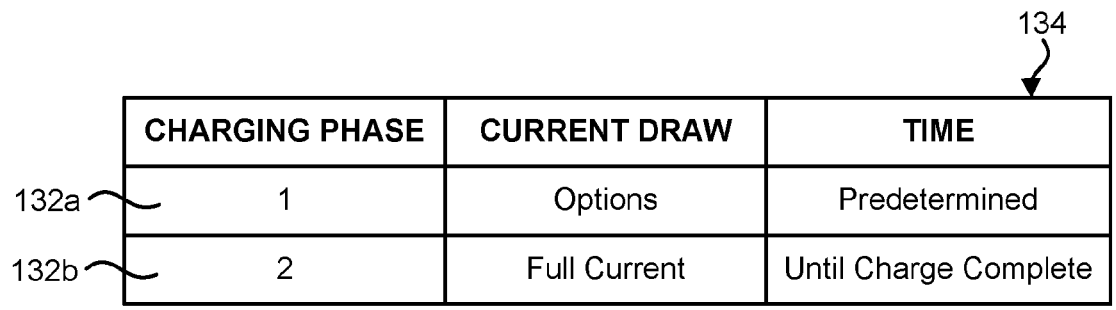
FIGS. 3A-D illustrate examples of data structures that may be used to store information relevant to the implementation of charging phases.

At step 206, in response to detecting placement of the reader 102 in the cradle 104, the charging system 122 may implement charging phases 132 (shown in FIG. 3A). There may be at least two charging phases 132: a first charging phase 132a followed by a second charging phase 132b. During at least some portion of the first charging phase 132a, the charging system 122 may not draw full current from the cradle 104. Thus, the first charging phase 132a may have the overall effect of delaying the charging of the battery 108. Several examples of the first charging phase 132a will be discussed below. The charging system 122 may draw full current from the cradle 104 during the second charging phase 132b.

At step 208, the charging system 122 may determine whether charging is complete. For example, the charging system 122 may determine whether the battery 108 has been fully charged. If it is determined that charging is not complete, then implementation of the charging phases 132 (step 206) may continue. If it is determined that charging is complete, then at step 210, the charging system 122 may activate the fully charged indicator light 124b.

FIG. 3A illustrates an example of a data structure 134 that may be stored within the memory 1544 of the reader 102 and that includes information relevant to the implementation of charging phases 132. As noted above, at least two charging phases 132 may be implemented. Each charging phase 132 may be characterized by at least two properties. A first property may be the amount of electrical current that is drawn from the cradle 104 during the charging phase 132. A second property may be the length of time that the charging phase 132 is carried out.

Regarding the first property (amount of electrical current drawn), there are several different options for how much electrical current may be drawn from the cradle 104 during the first charging phase 132a. These options will be discussed below in connection with FIGS. 3B-3D. During the second charging phase 132b, the charging system 122 may draw full current from the cradle 104.

Regarding the second property (length of time), the first charging phase 132a may be implemented for a time period 136. This time period 136, which may be predetermined, may be defined and stored in the memory 1544 of the reader 102. The second charging phase 132b may be implemented after the first charging phase 132a has been implemented for the time period 136. The second charging phase 132b may continue until the battery 108 is fully charged.

Figure 3B:
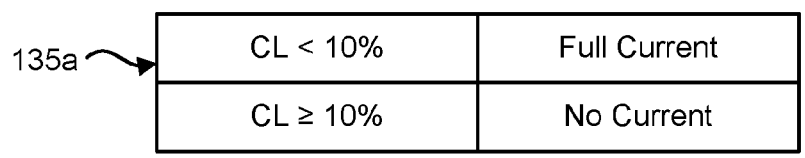
Figure 3C:
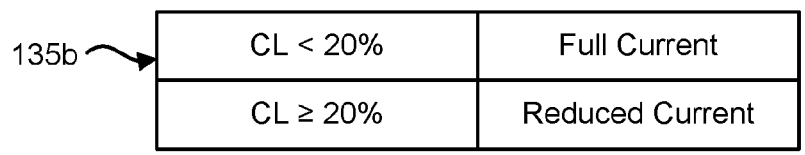
Figure 3D:
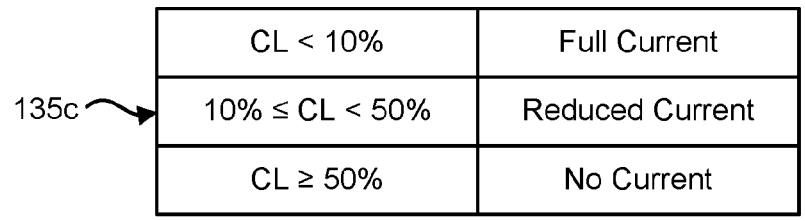

FIGS. 3B-3D illustrate examples of data structures 135 that may be stored within the reader 102 and that include information relevant to implementing the first charging phase 132a. The different data structures 135 illustrated in FIGS. 3B-3D correspond to different options for implementing the first property (amount of electrical current drawn) of the first charging phase 132a. For each option, the amount of electrical current that is drawn from the cradle 104 depends on the charge level 126 of the battery 108.

The data structure 135a shown in FIG. 3B illustrates a first option for how much electrical current may be drawn from the cradle 104 during the first charging phase 132a. With this option, the charging system 122 draws full current from the cradle 104 if the charge level 126 of the battery 108 is less than a first threshold level 128a. The charging system 122 draws no current from the cradle 104 if the charge level 126 of the battery 108 is greater than or equal to the first threshold level 128a. For purposes of example, in FIG. 3B the value of the first threshold level 128a is assumed to be 10%. The abbreviation "CL" stands for the charge level 126 of the battery 108.

The data structure 135b shown in FIG. 3C illustrates a second option for how much electrical current may be drawn from the cradle 104 during the first charging phase 132a. With this option, the charging system 122 draws full current from the cradle 104 if the charge level 126 of the battery 108 is less than the first threshold level 128a. The charging system 122 draws a reduced amount of current from the cradle 104 if the charge level 126 of the battery 108 is greater than or equal to the first threshold level 128a. The reduced amount of current is less than full current, but greater than zero current. In other words, the reduced amount of current means that some (non-zero) amount of current is being drawn from the cradle 104 so that the battery 108 is being charged to some extent, although not at full capacity. For purposes of example, in FIG. 3C the value of the first threshold level 128a is assumed to be 20%.

The data structure 135c shown in FIG. 3D illustrates a third option for how much electrical current may be drawn from the cradle 104 during the first charging phase 132a. With this option, the charging system 122 draws full current from the cradle 104 if the charge level 126 of the battery 108 is less than the first threshold level 128*a*. The charging system 122 draws a reduced amount of current from the charging cradle 104 if the charge level 126 of the battery 108 is greater than or equal to the first threshold level 128*a*, and also less than a second threshold level 128*b* that is greater than the first threshold level 128*a*. The charging system 122 draws no current from the cradle 104 if the charge level 126 of the battery 108 is greater than or equal to the second threshold level 128*b*. For purposes of example, in FIG. 3D the value of the first threshold level 128*a* is assumed to be 10% and the value of the second threshold level 128*b* is assumed to be 50%.

The specific values for the thresholds that were given above in connection with the options shown in FIGS. 3B-D are for purposes of example only, and should not be construed as limiting the scope of the present disclosure. One skilled in the art will understand that these thresholds may be set to any reasonable value.

The charging phases 132*a*, 132*b* do not necessarily require that "full" current is drawn from the cradle 104. For example, as an alternative to the option that is depicted in FIG. 3B, during the first charging phase 132*a* the charging system 122 may draw some (non-zero) amount of electrical current (although not necessarily "full" current) from the cradle 104 if the charge level 126 of the battery 108 is less than the first threshold level 128*a*. The charging system 122 may draw no current from the cradle 104 if the charge level 126 of the battery 108 is greater than or equal to the first threshold level 128*a*.

As an alternative to the option that is depicted in FIG. 3C, during the first charging phase 132*a* the charging system 122 may draw some (non-zero) amount of electrical current (although not necessarily "full" current) from the cradle 104 if the charge level 126 of the battery 108 is less than the first threshold level 128*a*. The charging system 122 may draw a reduced amount of current from the cradle 104 if the charge level 126 of the battery 108 is greater than or equal to the first threshold level 128*a*. In this context, the term "reduced amount" may mean any amount that is less than the amount of current that is drawn when the charge level 126 of the battery 108 is less than the first threshold level 128*a*.

As an alternative to the option that is depicted in FIG. 3D, during the first charging phase 132*a* the charging system 122 may draw some (non-zero) amount of electrical current (although not necessarily "full" current) from the cradle 104 if the charge level 126 of the battery 108 is less than the first threshold level 128*a*. The charging system 122 may draw a reduced amount of current (as the term "reduced amount" is defined in the previous paragraph) from the cradle 104 if the charge level 126 of the battery 108 is greater than or equal to the first threshold level 128*a*, and also less than the second threshold level 128*b*. The charging system 122 may draw no current from the cradle 104 if the charge level 126 of the battery 108 is greater than or equal to the second threshold level 128*b*.

Referring briefly to FIG. 1, the reader 102 may include a moisture sensor 148. The charging system 122 may be configured to adjust the length of delay with respect to charging the battery 108 based on output from the moisture sensor 148. For example, if the moisture sensor 148 indicates that there is a relatively high level of moisture on the charging contacts 112, then the length of delay may be increased (and vice versa). The length of delay may be adjusted by adjusting the time period 136 for which the first charging phase 132*a* is implemented. For example, to increase the delay, the time period 136 may be increased (and vice versa).

Reference is now made to FIG. 4, which illustrates various components that may be included in a barcode reader 1502. The barcode reader 1502 is an example of the barcode reader 102 that is included in the system 100 of FIG. 1.

The barcode reader 1502 is shown with a plurality of light sources 1506 that may be activated to illuminate a barcode 1510. The light sources 1506 may be controlled by an illumination controller 1504, which may be in electronic communication with other components in the barcode reader 1502 via a system bus 1540.

The barcode reader 1502 may also include optics 1512 and an image sensor 1514. The image sensor 1514 may include a two-dimensional array of light-sensitive elements, or photo sensors. The optics 1512 may focus light reflected from the target area 1508 (i.e., the area that is illuminated by the light sources 1506) onto the image sensor 1514. A housing (not shown) may be provided for shielding the light-sensitive elements in the image sensor 1514 from ambient light. The image sensor 1514 may be in electronic communication with other components in the barcode reader 1502 via the system bus 1540.

The barcode reader 1502 is also shown with a processor 1542 and memory 1544. The processor 1542 may control various aspects of the operation of the barcode reader 1502 and may be embodied as a microprocessor, a microcontroller, a digital signal processor (DSP), etc. The processor 1542 may perform logical and arithmetic operations based on program instructions stored within the memory 1544.

As used herein, the term "memory" may be broadly defined as any electronic component capable of storing electronic information, and may be embodied as read only memory (ROM), random access memory (RAM), magnetic disk storage media, optical storage media, flash memory devices in RAM, on-board memory included with the processor 1542, erasable programmable read-only memory, (EPROM), electrically erasable programmable read-only memory (EEPROM), registers, and the like, including combinations thereof. The processor 1542 and memory 1544 may be in electronic communication with other components in the barcode reader 1502 via the system bus 1540.

The memory 1544 may store a decoder 140, which may include program instructions executable by the processor 1542 for decoding barcodes. In addition, the memory 1544 may store program instructions 130 for implementing some or all aspects of the method 200 shown in FIG. 2. The memory 1544 may also store various types of data that may be used in connection with execution of the program instructions 130. For example, the memory 1544 may store the charge level 126 of the battery 108, the first threshold level 128*a*, the second threshold level 128*b*, the data structures 134, 135 shown in FIGS. 3A-D, the time period 136 for implementing the first charging phase 132*a*, and so forth.

The barcode reader 1502 may also include one or more programmable logic devices (PLDs) 1546. The PLDs 1546 may be programmed to carry out logic functions that implement, either partially or completely, some or all of the methods disclosed herein. Examples of different types of PLDs 1546 that may be used include field-programmable gate arrays (FPGAs), logic-cell arrays (LCAs), programmed arrays of logic (PALs), complex programmable-logic devices (CPLDs), and so forth. The PLDs 1546 may be in electronic communication with other components in the barcode reader 1502 via the system bus 1540. One or more application-specific integrated circuits (ASICs) may be used in place of or in addition to the PLDs 1546.

The barcode reader 1502 is also shown with a communication interface 1548 for communicating with other electronic devices. The communication interface 1548 may be based on wired communication technology, wireless communication technology, etc. Examples of different types of communication interfaces 1548 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. The communication interface 1548 may be in electronic communication with other components in the barcode reader 1502 via the system bus 1540.

The barcode reader 1502 is also shown with an input device controller 1550 for controlling input devices, such as keys, buttons, etc. The barcode reader 1502 is also shown with an output device controller 1552 for controlling output devices, such as a display screen. The input device controller 1550 and output device controller 1552 may be in electronic communication with other components in the barcode reader 1502 via the system bus 1540.

As noted above, the barcode reader 1502 shown in FIG. 4 is an example of the barcode reader 102 in the system 100 of FIG. 1. The barcode reader 102 includes a barcode reading system 106, which (as discussed above) may include an illumination system, at least one sensor, and a decoder. The barcode reading system 106 in the barcode reader 1502 includes an illumination system (the illumination controller 1504 and the light sources 1506), a plurality of sensors (the image sensor 1514, comprising a two-dimensional array of photo sensors), and a decoder (the decoder 140, stored in the memory 1544 and executed by the processor 1542). Alternatively, the decoder 140 may reside on an external device so that it is not part of the barcode reading system 106.

The barcode reader 1502 shown in FIG. 4 is a camera-based reader. However, the scope of the present disclosure should not be limited in this regard. The systems and methods disclosed herein may be utilized in connection with other types of barcode readers, such as charge-coupled device (CCD) barcode readers, pen-type barcode readers, laser barcode readers, etc. The nature of the illumination system, sensor(s), and decoder in the barcode reading system 106 may vary depending on the type of barcode reader that is being used. For example, if the barcode reader is a laser-type reader or a pen-type reader, the sensor(s) may take the form of a photodiode. In a laser-type reader, the illumination system may take the form of a laser.

One or more of the features, functions, procedures, operations, components, elements, structures, etc. described in connection with any one of the configurations described herein may be combined with one or more of the functions, procedures, operations, components, elements, structures, etc. described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A barcode reader, comprising:
a barcode reading system;
a rechargeable battery; and
a battery charging system that implements:
a first charging phase in response to detecting placement of the barcode reader in a charging cradle, wherein the first charging phase delays charging the battery if a charge level of the battery is above a first threshold level; and
a second charging phase after the first charging phase has been implemented for a time period.

2. The barcode reader of claim 1, wherein during the first charging phase the battery charging system:
draws electrical current from the charging cradle if the charge level of the battery is less than the first threshold level; and
draws no electrical current from the charging cradle if the charge level of the battery is greater than or equal to the first threshold level.

3. The barcode reader of claim 1, wherein during the first charging phase the battery charging system:
draws electrical current from the charging cradle if the charge level of the battery is less than the first threshold level; and
draws a reduced amount of electrical current from the charging cradle if the charge level of the battery is greater than or equal to the first threshold level.

4. The barcode reader of claim 1, wherein during the first charging phase the battery charging system:
draws electrical current from the charging cradle if the charge level of the battery is less than the first threshold level;
draws a reduced amount of electrical current from the charging cradle if the charge level of the battery is greater than or equal to the first threshold level and less than a second threshold level that is greater than the first threshold level; and
draws no electrical current from the charging cradle if the charge level of the battery is greater than or equal to the second threshold level.

5. The barcode reader of claim 1, wherein during the second charging phase the battery charging system draws electrical current from the charging cradle.

6. The barcode reader of claim 1, wherein:
the barcode reader further comprises an indicator light; and
the battery charging system is further configured to activate the indicator light in response to detecting the placement of the barcode reader in the charging cradle.

7. The barcode reader of claim 1, further comprising a moisture sensor, wherein the battery charging system adjusts a length of delay with respect to charging the battery based on output from the moisture sensor.

8. A system, comprising:
a barcode reader that comprises a barcode reading system, a rechargeable battery, and a battery charging system; and
a charging cradle for the barcode reader;
wherein the battery charging system implements:
a first charging phase in response to detecting placement of the barcode reader in the charging cradle, wherein the first charging phase delays charging the battery if a charge level of the battery is above a first threshold level; and a second charging phase after the first charging phase has been implemented for a time period.

9. The system of claim 8, wherein during the first charging phase the battery charging system:
   draws electrical current from the charging cradle if the charge level of the battery is less than the first threshold level; and
   draws no electrical current from the charging cradle if the charge level of the battery is greater than or equal to the first threshold level.

10. The system of claim 8, wherein during the first charging phase the battery charging system:
    draws electrical current from the charging cradle if the charge level of the battery is less than the first threshold level; and
    draws a reduced amount of electrical current from the charging cradle if the charge level of the battery is greater than or equal to the first threshold level.

11. The system of claim 8, wherein during the first charging phase the battery charging system:
    draws electrical current from the charging cradle if the charge level of the battery is less than the first threshold level;
    draws a reduced amount of electrical current from the charging cradle if the charge level of the battery is greater than or equal to the first threshold level and less than a second threshold level that is greater than the first threshold level; and
    draws no electrical current from the charging cradle if the charge level of the battery is greater than or equal to the second threshold level.

12. The system of claim 8, wherein during the second charging phase the battery charging system draws electrical current from the charging cradle.

13. The system of claim 8, wherein:
    the barcode reader further comprises an indicator light; and
    the battery charging system is further configured to activate the indicator light in response to detecting the placement of the barcode reader in the charging cradle.

14. The system of claim 8, further comprising a moisture sensor, wherein the battery charging system adjusts a length of delay with respect to charging the battery based on output from the moisture sensor.

15. The system of claim 8, wherein the charging cradle comprises a heater and a controller that activates the heater in response to detecting insertion of the barcode reader into the charging cradle.

16. The system of claim 8, wherein the charging cradle comprises a fan and a controller that activates the fan in response to detecting insertion of the barcode reader into the charging cradle.

17. A method, implemented by a barcode reader comprising a rechargeable battery, comprising:
    detecting placement of the barcode reader into a charging cradle;
    determining whether a charge level of the battery is above a first threshold level;
    implementing a first charging phase in response to detecting the placement of the barcode reader into the charging cradle, wherein the first charging phase delays charging the battery if the charge level of the battery is above the first threshold level; and
    implementing a second charging phase after the first charging phase has been implemented for a time period, wherein during the second charging phase a battery charging system of the barcode reader draws electrical current from the charging cradle.

* * * * *